United States Patent [19]
Van Bonin et al.

[11] 3,864,137
[45] Feb. 4, 1975

[54] HYDROGEN PEROXIDE BLOWING AGENT FOR SILICATE FOAMS

[75] Inventors: Wulf Van Bonin; Ulrich Nehen, both of Leverkusen; Ulrich Von Gizycki, Cologne, all of Germany

[73] Assignee: Bayer Aktiengesellshaft, Leverkusen, Germany

[22] Filed: May 24, 1973

[21] Appl. No.: 363,671

Related U.S. Application Data
[63] Continuation-in-part of Ser. No. 318,068, Dec. 26, 1972.

[30] Foreign Application Priority Data
Dec. 31, 1971  Germany............................ 2165912
Mar. 25, 1972  Germany............................ 2214609
June 7, 1972   Germany............................ 2227608

[52] U.S. Cl.................................. 106/75, 106/84
[51] Int. Cl...................................... C04b 35/16
[58] Field of Search........................... 106/75, 40 R

[56] References Cited
UNITED STATES PATENTS
3,095,312  6/1963  Holmes............................... 106/75
3,725,095  4/1973  Weidman et al...................... 106/75

Primary Examiner—J. Poer
Attorney, Agent, or Firm—Burgess, Dinklage & Sprung

[57] ABSTRACT

In the production of foams by mixing an aqueous silicate solution with a blowing agent and a hardener which splits off acid the improvement which comprises using hydrogen peroxide as the blowing agent.

5 Claims, No Drawings

HYDROGEN PEROXIDE BLOWING AGENT FOR SILICATE FOAMS

This application is a continuation-in-part application of U.S. Pat. application Ser. No. 318,068, filed Dec. 26, 1972.

This invention relates to a process for the production of foam resins which have a structure consisting substantially of silicates.

It has already been proposed that aqueous silicate solutions, optionally containing a thickener, may be beaten into a foam with air and then left to harden (see e.g. French Pat. Specification No. 2,055,341).

Processes of this kind have the disadvantage that the foam which is left to harden keeps a constant volume during the hardening process or even shrinks. It is difficult to achieve complete filling of complicated molds, for example molds with undercuts, or to carry out processes of foaming in a mold in which it is important that the foam should exert a certain pressure against the walls of the mold, for example, in order to ensure a firmer bond between the foam and the material lining the mold or more thorough penetration of the material with the foam.

In the course of further development of this process it has now been found that it is particularly advantageous to use hydrogen peroxide as the blowing agent, because this obviates the use of organic blowing agents which give rise to ecological problems.

If an approximately 40% soda waterglass solution, for example, is mixed with an approximately 30% hydrogen peroxide solution, then a relatively stable mixture is obtained, i.e. only moderate decomposition of the hydrogen peroxide takes place. It has surprisingly been found that as soon as a hardener is added to the mixture, a sharp increase in the rate of decomposition of hydrogen peroxide instantly sets in and the rate of decomposition continues to increase in the course of the reaction and vigorous foaming takes place. It is also surprisingly found that the gelling of waterglass solutions by means of hardeners which effect only slow gelling when used on their own substantially accelerated by the addition of even small quantities of $H_2O_2$. In this way it is possible, even with gelling agents which are only slow hardeners, to produce foam resins which have dry densities in the range from about 0.03 to 0.95. The advantages of this process are, firstly, that foaming may be carried out without the addition of organic blowing agents, although these may, of course, be used in addition to hydrogen peroxide if desired, and, secondly, that preheating of the reactants is generally unnecessary since the foaming reaction obtained by this process will set in even at temperatures near 0°C and liberates so much heat that the reaction mixture becomes heated.

The aqueous silicate solutions used for the process according to the invention may be solutions of silicates in water or aqueous media which may have the character of either true solutions or colloidal solutions, for example ammonium silicates or metal silicates or silicic acid sols which have been stabilized with alkali. The silicate solutions used are preferably alkali metal silicate solution, e.g. sodium and/or potassium silicate solutions. Very suitable starting material are the so-called waterglass solutions which have long been available commercially. The silicate dissolved in the solutions need not necessarily correspond to the formula (I):

$$Na_nO \cdot 3-4\ SiO_2 \quad (1)$$

which is the basis for waterglasses. The ratio of alkali metal oxide to $SiO_2$ may vary e.g. from $Na_4SiO_4$ to polysilicates with various degrees of polymerization in which the ratio of alkali metal oxide to $SiO_2$ is less than 1 : 1, e.g. 0.1 : 1. It is a necessary condition, however, that the silicate solution should be fluid. The upper limit of concentration of these solutions is about 60% because of the requirement for fluidity of the solutions, although more highly concentrated solutions could still be worked up, for example in kneading apparatus at elevated temperatures. The lower limit of concentration is fixed by the fact that solutions which have a solid content of less than about 5% generally only give rise to gels with insufficient mechanical strength. It is preferred to use silicate solutions with a solids content of from about 10 to 50% by weight.

By inorganic additives are meant gaseous, liquid or solid additives which may be soluble or insoluble in the silicate solution, provided they are compatible with it, i.e. do not bring about premature precipitation of the silicate solution under the conditions under which mixing is carried out.

These additives may be fillers, diluents or special auxiliary agents.

The fillers used may be inorganic or organic substances e.g. in the form of powders, granulates, wire, fibers, dumb-bell shaped particles, crystallites, spirals, rods, beads, hollow beads, foam particles, fleeces, woven fabrics, knitted fabrics, tapes, pieces of foil, etc., for example dolomite, chalk, clay, MgO, asbestos, basic silicic acids, sand, quartz, talcum, iron oxide, aluminum oxide and hydroxides, alkali metal silicates, zeolites, mixed silicates, calcium silicates, calcium sulfates, alumoxilicates, cements, basalt wool or powder, glass fibers, carbon fibers, graphite, carbon black, Mg, Al, Fe, Cu, or Ag powder, molybdenum sulfide, steel wool, bronze or copper fabrics, silicon powder, expanded clay particles, hollow glass beads, vermiculite, perlite, glass powder, particles of lava and pumice, wood shavings, sawdust, cork, cotton, straw, popcorn, coke or particles of filled or unfilled, foamed or unfoamed, stretched or unstretched organic polymers. The following are a few examples taken from the large number of organic polymers which may be used e.g. in the form of powders, granulates, foam particles, beads, hollow beads, foamable but not yet foamed particles, fibers, tapes, fabrics, fleeces, etc.: polystyrene, polyethylene, polypropylene, polyacrylonitrile, polybutadiene, polyisoprene, polytetrafluoroethylene, aliphatic and aromatic polyesters, melamineurea or phenol resins, polyacetal resins, polyepoxides, polyhydantoins, polyureas, polyethers, polyurethanes, polyimides, polyamides, polysulfones, polycarbonates, polyvinyl chloride, polyvinylidene chloride or halogenated polymers such as chlorine rubber or chloroparaffins or, of course, any copolymers provided they are compatbile with the silicate solutions.

Materials which should be particularly mentioned as fillers, are dolomite, chalk, asbestos, talcum, sand, quartz, glass in any form, carbon, polystyrene, polyvinyl chloride and polyethylene in the foamed or unfoamed state, terephthalic acid polyesters, polyacrylonitrile, polyamides, polypropylene, and polyurethanes in the form of fibers, fleeces, fabrics or foams.

According to one particular embodiment of the process of the invention, the preliminary stages of solid polymers may also be used as additives or fillers in a solid or liquid form if they are compatible with the silicate solutions and they may subsequently be polymerized or hardened by suitable reactions during or after the hardening process. Compounds which are suitable for this purpose are, for example alkyd resins, styrene, mixtures of styrene and unsaturated compounds e.g. maleic acid polyesters, diallylphthalate or methylmethacrylate or solutions of monomers in polymers, epoxides or butadiene oligomers.

Other substances which are also suitable for this purpose are, for example, oil lacquers, melamine, urea, phenols or other substances which, when added to other reactive components which are compatible with the silicate solutions, are capable of bringing about a hardening, polymerization, polycondensation or polyaddition process which may take place side by side with the hardening of the silicate solution.

Gaseous additives which are compatible with the silicate solutions may also be regarded as bulk fillers, to a greater or lesser extent, for the process according to the invention. These gases, which may be oxygen, nitrogen, $SF_6$, hydrogen, a noble gas, methane or $CF_4$, but preferably air, may be added to the silicate solutions under pressure or without pressure, optionally in admixture with other additives. The additional use of foam forming and foam stabilizing auxiliary agents which will be described hereinafter is advantageous in this case.

Molded products which have been foamed by the process according to the invention can be obtained in this way; the addition of gases as well as of the other fillers, diluents or auxiliary agents, in other words of the additives, may be carried out, completely or partly, during or immediately after the addition of the additives which effect hardening, and they may be added in one or several stages.

Those additives which function as fillers are generally added in such quantities that the amount of dissolved silicate in the reaction mixtures will be as far as possible above about 5% by weight and preferably from about 10 to 50% by weight.

Diluents may also be used as additives. These may be either aqueous or non-aqueous.

Apart from the use of polymer solutions such as solutions of alkyd resin lacquers, polystyrene, polyesters or rubber in petroleum hydrocarbons, benzene, xylene or chloroform, or solutions of phenol-, urea- or melamineformaldehyde precondensates in water, one instance which constitutes a boundary case in the use of fillers is the use of polymer dispersions as diluents. The polymer dispersions which may be used for this purpose may be obtained by conventional processes but they must be compatible with silicate solutions in two respects, i.e. they must not precipitate the silicate solution nor must they be precipitated by the silicate solution.

These diluents may be used in such quantities that the silicate content of the mixtures is above about 5% by weight and preferably from about 10 to 50% by weight.

Other diluents may also be used in about the same proportions provided they satisfy the conditions of compatibility, e.g. aqueous solutions or diluents which are insoluble in the silicate solution; these may also serve as diluents for the hardeners which are subsequently added. The following are examples of such diluents: aliphatic and aromatic hydrocarbons such as benzene, toluene, xylene styrene, petroleum hydrocarbons, paraffin oil or paraffin waxes; fatty acid esters, bis-(hydroxyethyl)-terephthalate, diethylcarbonate, glycol diacetate, diethylphthalate, silicones, triethylphosphate, ethylbenzoate, butylacetate, ethylorthoformate or oleic acid glycerides; or chlorinated hydrocarbons such as halomethanes, mineral oil fractions, bitumen, etc...

The compounds added as blowing agents may also be included among these diluents, e.g. hydrocarbons or halogenates hydrocarbons with boiling points of about −25°C to +50°C, such as butane, isopentane, dichloromethane, trichlorofluoromethane or dichlorofluoromethane.

According to the present invention, hydrogen peroxide is used as blowing agent, preferably in aqueous solution. This solution may have any concentration, but for reasons of efficiencey it is advantageous to use a concentration above about 3 % by weight and for reasons of safety it is advisable not to exceed a concentration of about 50%. Based on the total quantity of reaction mixture or foaming mixture, the concentration of hydrogen peroxide to be used are about 0.05 to 20 % by weight, preferably about 0.10 to 10 % by weight. Although which liberate hydrogen peroxide in an aqueous medium, e.g. persulfates, peroxides of alkali metals or alkaline earth metals, perphosphates or perborates, it is generally preferable to use hydrogen peroxide in the form of organic solutions or in particular aqueous solutions.

Although substances which catalyze the decomposition of hydrogen peroxide, e.g. metal oxides, such as manganese dioxide or iron oxide, copper, coppersalts, copper complexes, e.g. copper tetramine complex, or organic catalases, may be added, this is not necessary in view of the observation that the decomposition of hydrogen peroxide in silicate solutions can be accelerated by the addition of gelling agents.

One interesting variation of the process is the simultaneous use of $H_2O_2$ and volatile organic blowing agents.

The special auxiliary agents from the group of inorganic or organic auxiliary agents include not only dyes, perfumes, thickeners such as methyl cellulose, starch and compounds which render the reaction mixture hydrophobic, such as silicones or fluorinated compounds, but in particular also wetting agents, foam stabilizers, pore regulators and ionic or non-ionic emulsifiers. Particularly important among these auxiliary agents are pore regulators and emulsifying substances which can substantially facilitate the incorporation of the hardeners and other additives. In addition to the non-ionic compounds, which are mostly products formed by addition of alkylene oxides such as ethylene oxide to hydrophobic siloxanes, fatty acids, fatty alcohols or phenols, or copolymers of ethylene oxide and propylene oxide, it is particularly advantageous to use fatty acidsalts or better alkylsulfonates which contain about 10 to 18 C-atoms in the alkyl radical. These compounds are highly compatible with silicate solutions, are efficient emulsifiers for systems which have a continuous aqueous phase, and they produce a good foaming effect. These auxiliary agents are used either in their pure form or preferably in the form of their aqueous solutions or dispersions or also as solutions in the silicates diluents or in the blowing agents or hardeners. The reaction mixture may contain them in a quantity of about 0.005 to 40% by weight, preferably from 0.01 to 15% by weight. This quantity may be exceeded in special cases, for example if the molded article to be produced is required to be very strongly hydrophilic or is intended to be used as a vehicle for these substances.

The hardeners belong to known classes of compounds. Mixtures of various hardeners may be used in order to vary the thickening and hardening times. Mixtures of hardeners with other additives which bring about solidification of alkali metal silicate solutions may also be use, e.g. mixtures with pyrocarbonic acid esters or carboxylic-carbonic acid ester anhydrides or other carboxylic acid esters which have a hardening action or the additives described in Belgian Pat. Specification No. 753,761 or e.g. in German Offenlegungsschrift Nos. 2,039,736 and 2,036,842, the disclosures of which are incorporated herein by reference. According to the invention, any substances which produce an acid reaction in aqueous media, for example by liberating $CO_2$, carboxylic acids, sulphonic acids or mineral acids, may in principle be used as hardeners.

It is particularly suitable to use those hardeners or mixtures of hardeners which are liquid at temperatures below about 50°C and particularly those which are still liquid below about 30°C because these hardeners are technically particulatly easy to handle.

The substances preferably used as hardeners are therefore aliphatic, cyclic, araliphatic or aromatic compounds derived, for example, from the following classes of compounds: Carboxylic acids, carboxylic acid anhydrides and mixed anhydrides, esters of chlorinated or brominated carboxylic acids or alcohols, for example esters of mono-, di- or trichloroacetic acid, carboxylic acid halides, halides of aromatic mono-, di- or tricarboxylic acids which may be substituted in the nucleus, such as alkyl benzoic acid chlorides, dichlorobenzoyl chloride or trichloro-methyl-benzoyl chlorides or their chlorination products or chlorination products of other aliphatic or aromatic acid clorides, other aliphatic or aromatic compounds containing reactive halogen atoms which give rise to the formation of HCl in an alkaline aqueous medium, e.g. benzotrichloride, benzal chloride, tetrachloroxylene, bis-trichloromethylbenzene or chlorination products of paraffins or of olefins, e.g. commercial telomers of ethylene and $CCl_4$, chlorination products of oligomers or polymers of vinyl acetate, ethylene, isobutylene, propylene, vinyl chloride, isoprene, or butadiene, allyl chloride or allyl bromide, commercial mixtures or fractions of mon-, di- and trichloropropane and -propene, chloroformic acid esters of alcohols, glycols, polyols and ohenols, dichloroformic acid esters of butanediol, hexanediol or pentaglycol, α-chloracetic acid esters of glycol, 1,2-propyleneglycol, glycerin, carbamic acid chlorides, sulfochlorides such as o-tosyl chloride or other substituted aromatic sulfochlorides such as chlorination products of tosyl chloride or of benzene sulfochloride as well as the corresponding sulfonyl halides, sulfonic acid esters, esters of various phosphoric acids such as tris-dibromopropyl phosphate, phosphites or phosphates of other chlorinated or brominated alcohols, isocyanates such as hexamethylene diisocyanate, isophorone diisocyanate or 4,4'-diphenylmethane -diisocyanate, imidochlorides, chloramines, isocyanide dichlorides, e.g. toluene-bis-isocyanide dichloride, phenylisocyanide dichloride, trichloromethyl isocyanide dichloride, 1,2-dichloroethyl isocyanide dichloride, 1,1,2-trichloroethylisocyanide dichloride, pentachloroethylisocyanide dichloride, chlorocarbonyl isocyanide dichloride (it is noted in this connection that reaction products of chlorocarbonylisocyanide dichloride, for example, with alcohols such as glycol or butanediol, hexanediol or amines in which the isocyanide dichloride structure is in most cases preserved are also satisfactory hardeners), chloropyrimidines or halotriazines such as cyanuric chloride.

The above list serves only to illustrate by way of example the substances which may be used as hardeners for the process. The hardeners used according to the invention may in principle be any compounds which react in an aqueous-alkaline medium, such as that of a silicate solution, to liberate e.g. $CO_2$, a carboxylic acid, a phosphonic acid or a mineral acid, the acid compound liberated being, of course, neutralized to a greater or lesser extend in the medium.

Particularly interesting are chloroformic acid esters, chloroacetic acid esters, isocyanide dichlorides, sulfochlorides, carboxylic acid chorides and compounds which contain aliphatically bound labile chlorine.

In addition to these hardeners there may, of course, also be used substances which also bring about gelling of silicate solutions, for example amides, alcohols, ethers or esters. These additional substances in most cases are to some extent soluble in water and probably bring about a change of the silicate sol by a colloidal chemical reaction. Specific examples are: Glycerol triacetate, vinyl acetate, dimethylformamide, dioxane and dimethylmaleate.

The hardeners mentioned above may be used alone or in admixture with each other or with other substances which cause silicate solutions to gel, e.g. with dibutylpyrocarbonate, isophthalic acid-bis-carbonic acid-monopropylester anhydride, titanium tetrabutylate, aluminum octoate, magnesium phosphate, sodium silicofluoride or other organic or inorganic substances which function as hardeners for silicate solutions.

The hardener or mixture of hardeners should be used in a quantity of about 0.01 to 60 % by weight, preferably about 0.5 to 30 % by weight, based on the quantity of reaction mixture.

The hardening substances may quite well be used alone, i.e. without $H_2O_2$. In that case, however, no foams are obtained but more or less solid masses.

The process according to the invention for producing the foam resins is basically carried out by mixing the above described reaction components either in a single stage or in several stages in an intemittently or continuously operating mixing apparatus, and then leaving the resulting mixture to foam up and solidify, usually outside the mixing apparatus, in molds or on suitable supports. The inital reaction temperature employed, which is in the range from about −10° to 120°C, preferably from about +10°C to 60°C, may be obtained either by heating one or more reactants before the mixing process or by heating the mixing apparatus or by heating the reaction mixture after the mixing process. In most cases, of course, these and other methods for adjusting the initial reaction temperature are not necessary. Sufficient heat is usually evolved during the reaction that whatever the original reaction temperature may be, it can possibly rise from 40°C up to values above 100°C after reaction or foaming process begins.

For any given formulation of the mixture, the properties of the resulting foams, e.g. their density in the moist state, depend on the details of the mixing process, e.g. the form and speed of the stirrer, the form of the mixing chamber, etc. as well as on the selected reaction temperature at which foaming is initiated. The density may vary from about 0.03 to 0.95 and is in most cases about 0.15 to 0.8 when the foam is still fresh and moist. The dried foams may have closed or open cells but are in most cases open celled and have a density of about 0.05 to 0.9.

If desired, the silicate solutions, which may already contain inorganic and/or organic additives, may, of course, first be converted into a state of higher viscosity by the addition of a less than equivalent quantity of hardener, i.e. a quantity which is sufficient to effect condensation of the silicates or silicic acid to produce higher molecular weight aggregates but insufficient to effect final cross-linking and hence solidification, and hardening may subsequently be completed to any degree desired after storage of the product or any other technical manipulations, if necessary by the addition of further quantities of hardener.

The behavior of the reaction mixtures opens up numerous possible applications for the process of the invention and hence different fields of application of the products, some of which will be briefly outlined by way of example below. It is possible to choose in each individual case, according to the intended application of the product, whether the water contained in the hardened mixtures should be left in the foam as a desired constituent and the foam should be protected against loss of water by applying a suitable coating or laminate or whether the water should be partly or completely removed by suitable drying processes, e.g. in a heating cupboard or by hot air, infra-red heating or ultrasound or microwave or high frequency heating.

The reaction mixture containing the blowing agent may, for example, be painted on hot or cold supports or supports irradiated with infra-red radiation or high frequency radiation or it may, after passing through the mixing apparatus, be sprayed on these supports with the aid of compressed air or by the airless spraying process and it may then be left to foam up and harden on the supports to provide a filling or insulating or fiber-retardant coating. The foaming reaction mixture may also be forced, poured or injected into cold or heated, open or closed molds which may be either relief forms or solid or hollow molds, and left to harden, optionally under pressure and optionally using a centrifugal casting process at room temperature or temperatures of up to 200°C. Reinforcing elements such as inorganic and/or organic or metal wires, fibers, fleeces, foams, fabrics or reinforcing skeletons, etc. may be added. This may be carried out, for example, by the process of impregnating fiber mats or by processes in which the reaction mixtures and reinforcing fibers are together applied to the mold, e.g. by means of a spray device. The molded products which can be produced in this way may be used as building elements, e.g. in the form of foamed or non-cellular sandwich panels which may be produced either directly as such or by subsequently laminating with metal, galss, synthetic resins, etc., a particular advantage of these building elements being their fire-resistance in the moist or dry state. Alternatively, the molded products may be used as hollow bodies, for example as containers for goods which have to be kept moist or cool, or they may be used as filter materials or exchangers, as catalyst carriers or carriers of active substances, as decorative elements, furniture components or fillings for cavities. They may also be used as heavy duty lubricants or coolants, e.g. for metal extrusion presses. Other possible fields of application are the construction of models and molds, acoustic insulation or absorption, and the manufacture of molds for metal casting.

According to a preferred method of carrying out the process, foaming and hardening are carried out simultaneously, e.g. by preparing the reaction mixture in a mixing chamber and at the same time adding the blowing agent, for example a 30% $H_2O_2$ solution, so that the reaction mixture discharged from the mixing chamber foams up because of the decomposition of the blowing agent and at the same time hardens owing to the action of the hardener, and the resulting foam, possibly still containing emulsifiers, foam stabilizers and other auxiliary agents, is fixed. Furthermore, the reaction mixture which is initially a thin liquid may be blown up into a foam by the introduction of a gas such as air, methane, $CF_4$ or a noble gas, optionally under pressure, the foam then being introduced into the required mold and hardened. Alternatively, of course, the silicate solution, which may contain foam stabilizers such as wetting agents, foam forming agents, emulsifiers and possibly also other organic or inorganic fillers or diluents, may be converted into a foam by the addition of $H_2O_2$ and optionally a decomposition catalyst, and this foam may then or before be mixed in a mixing apparatus with the hardener which serves as a precipitating agent and may, if desired, then be left to continue to foam up before it is left to harden.

The foams obtainable by this process may be used in the dried or moist state, optionally after a compression or heating process and optionally under pressure and may serve as acustic or thermal insulating materials, cavity fillings, packaging materials and building or molding materials with high solvent resistance and fire resistance. They may also be used as lightweight building elements in the form of sandwiches e.g. with covering layers of metal, gypsum or cement for housebuilding, vehicle construction or aircraft construction.

The reaction mixtures may also be dispersed in the form of droplets, e.g. in petroleum hydrocarbons, or foamed up and hardened while under free fall or by a similar method to produce foam beads.

Organic and /or inorganic particles which are capable of foaming or have already been foamed, e.g. expanded clay, expanded glass, vermiculite, perlite, wood, popcorn, cork, polymer particles which contain blowing agents, for example polystyrene beads or granulates which contain hydrocarbons and which can therefore also foam up during the foaming process, hollow beads of synthetic resins such as vinyl chloride polymers, polyethylene or styrene polymers or foam particles made of these synthetic resins or of other polymers, e.g. polysulfone, polyepoxide, polyurethane, ureaformaldehyde, phenolformaldehyde or polyimide polymers may be incorporated with the foaming reaction mixture while it is still fluid, or the reaction mixtures may be foamed up through masses of these particles to permeate them so that insulating materials which have good fire resistance are produced.

If, at the same time, a blowing agent is added to a mixture of aqueous silicate solutions, optionally containing inorganic and/or organic additives, and the hardeners at a given temperature, which is above the temperature at which the blowing agent decomposes, then the resulting mixture, which is at first liquid, can be used not only for producing uniform foams or foams which contain foamed or non-foamed fillers but it can also be used for permeating foamed or non-cellular fleeces, fabrics, grids, structural parts or other permeable structures with the foam to produce composite foam structures which have special properties, e.g. high fire resistance, which may, if desired, be used directly as structural elements in the building, furniture, vehicle or aircraft industry.

The foams which can be produced by the process according to the invention may be added to soil in a crumbled form, optionally with the addition of fertilizers and plant protective agents to improve its consistency for agricultural purposes. Foams which have a high water content may be used as substrates for the propagation of seedlings or cuttings and the cultivation of plants and care of cut flowers. Terrain which is impossible or too loose, for example dunes or swamps, can be made firm by spraying them with the mixtures so that it becomes passable and is protected against erosion within a short time.

The reaction mixtures proposed in this invention are also important in case of fire or disaster, where they can be sprayed on an article to protect it. In that case, the water present in the mixture is retained on the surface of the article which is being protected and cannot evaporate rapidly, and consequently the article is very effectively protected against the effect of fire, heat or radiation, because so long as the hardened mixture still contains water it cannot be heated much above 100°C or absorb infra-red or nuclear radiation.

As these mixtures are easily sprayable, they can provide effective bariers and protective layers in mines in the case of accident or also for routine work, by spraying them e.g. on fabrics or other surfaces or grids or only on the walls. One characteristic of the mixtures which is particularly important in this connection is that they can harden within a very short time.

The foaming mixtures according to the invention may also be used in underground and surface engineering, oil drilling and road building for the erection of walls and igloos, for sealing, pointing, plastering, laying foundations, insulating and decorating and as coating compositions, flooring compositions and paving material. They may also be used as adhesives or mortar or casting compositions, in which case they may be used as inorganic or organic fillers.

Since the hardened foams produced by the process according to the invention may be very porous after drying, they are suitable for use as drying agents because they can then absorb water again, but they may also be charged with active substances or used as catalyst carriers or filters and absorbents.

The properties of the foams in their aqueous or dried state can be adjusted as desired by means of auxiliary substances such as emulsifiers, detergent raw materials, dispersing agents, wetting agents, scents, catalysts, or substances which render the products hydrophobic. These substances may either be used in the reaction mixture or introduced subsequently.

Alternatively, the foams, in the aqueous or dried or impregnated state, may subsequently be lacquered, coated, laminated, galvanized, vapor coated, bonded or flocked. Subsequent shaping processes may be carried out on the molded products either in the aqueous or dried state, for example by sawing, milling, drilling, planing, polishing or the like.

The molded articles, with or without fillers, may be further modified in their properties by thermal after treatment processes, oxidation processes, hot pressing, sintering processes or surface melting or other compression processes.

Suitable materials to be used for the molds are inorganic and/or organic foamed or non-cellular materials such as metals, e.g. iron, nickel or refined steel, lacquered or Teflon-coated aluminum, porcelain, glass, gypsum, cement, wood, paper, cardboard, synthetic resins such as PVC, polyethylene, polyurethane, ABS, polycarbonate, etc..

The foams obtainable by the process according to the invention may be dried on the surface or, if they are substantially permeable structures such as foams with very open cells or porous materials, they may also be dried by centrifuging or vacuum treatment or by blowing air through them or rinsing them with (optionally heated) dehydrating liquids or gases such as methanol, ethanol, acetone, dioxane, benzene, chloroform and the like or air, $CO_2$ or superheated steam. The moist or dry molded articles may also be after-treated in an analogous manner by rinsing or impregnating them with aqueous or non-aqueous acid, neutral or basic liquids or gases, e.g. hydrochloric acid, phosphoric acid, formic acid, acetic acid, ammonia, amines, organic or inorganic salt solutions, water-glass solutions, lacquer solutions, solutions of monomers which have yet to be polymerized or have already been polymerized, dye solutions, galvanization baths, solutions of catalysts or of catalyst precursors and scents.

The description given above is intended to explain the general possibilities of technical application of the molded articles produced by the process according to the invention, i.e. to explain the possible uses of the product, which in most cases are already determined by the method of production, but the description lays no claim to completeness.

The process according to the invention will now be explained with the aid of examples. The parts given are parts by weight unless otherwise indicated.

The method of determining the gelling time obtained with various hardeners or hardener mixtures will first be described with reference to several prototypes of hardeners used as examples. All the substances and apparatus used are adjusted to a temperature of 25°C. 100 g of soda waterglass solution (density 1.36, $Na_2O$ content approximately 8.6% by weight, $SiO_2$ content approximately 25.4% by weight) in which 0.5% by weight of $C_{14}$-alkyl sulfonate sodium has been dissolved are introduced into a beaker (diameter 5 cm) equipped with a stirrer. An L-shaped glass rod is then dipped into the solution to half the depth of liquid. The distance of the bent arm of the rod from the wall of the beaker is about 5 mm. The glass rod is rotated at the rate of 250 rpm and acts as a stirrer, the beaker being kept still. The hardening substance is then introduced into the stirred waterglass solution and the time from that moment until the mixture, which is at first easily stirrable, becomes solid is measured. This time is taken as the gelling time.

The most suitable hardeners and hardener mixtures for the process described here are those which have a gelling time of over 5 minutes by this test, for example benzotrichloride, dichlorobenzene sulfonic acid chloride, o-tosyl chloride, butanediol-bis-chloroformate, hexanediol-bis-chloroformate, dipropylene glycol-bis-chloroformate or 5-chloro-isophthalyl chloride, but if the process is carried out rapidly and the foams are not required to rise too high it is also possible to work or prepare mixtures with more rapidly acting hardeners, for instance propyleneglycol-1,-2-bis-chloroacetic acid ester.

EXAMPLE 1

This example is intended to illustrate the acceleration of decomposition of hydrogen peroxide in silicate solutions after the addition of hardener.

Approximately 10% by weight of a 30% aqueous hydrogen peroxide solution are stirred into approximately 38% commercial soda waterglass solution which contains 0.5% by weight of $C_{14}$-Na-alkylsulfonate as emulsifier. The resulting mixture is poured into a beaker in which it undergoes hardly any foaming or heating at about 20°C. If, however, 20 parts of o-tosyl chloride are stirred into 200 parts of this mixture, then the mixture starts to foam at once and solidifies to a foam product with heating.

This experiment can be repeated both with potash waterglass solutions and with soda waterglass solutions of various concentrations, for example 30% or 50% soda waterglass solutions. Other hardeners may also be used to demonstrate the decomposition effect, e.g. benzoyl chloride, trichloromethylisocyanide dichloride, butanediol-bis-chloroformate, dichlorobenzene sulfonic acid chloride, cyanuric chloride, benzotrichloride, 2-isopropyloxy-4,6-dichloro-s-triazine, diethylsulfate, glycol-bis-trichloroacetate, etc..

The moist foams obtained by this process are dried in a circulating air cupboard after a storage time of about 40 hours. Fine cellular foams with a unit weight of less than about 0.5 g/cm³ are obtained in all cases. Since the simple method of foaming described above in most cases results in the formation of "foam heads" which are not representative of the foam in their properties, it is only suitable for demonstrating the foaming process as such.

Since foaming and hardening often proceed very rapidly, the method of mixing the reaction mixture with a simple stirrer in a glass beaker is in many cases inadequate because it takes too much time. A continuous method of foaming is described below both for this reason and because it is more suitable for producing molded foam products or foam blocks or foam webs as well as foam beads:

The process is carried out using a mixing head of the kind which has already been developed for the production of polyurethane foams.

It consists of a mixing chamber which contains a very efficient high speed rotary stirrer into which the reactants are injected from high pressure pumps through injection nozzles. After passing through the stirrer, the now vigorously mixed reaction mixture is discharged at a suitable rate into the mold or onto an assembly line through a discharge conduit of variable length and cross-section which is adapted to be closed with a valve. The advantage of this apparatus is that very large quantities of reaction mixture can be optimally mixed and continuously produced within very short times. The reaction mixture is therefore still a thin liquid when it leaves the heatable mixing chamber and can spread out in the mold or on the assembly line and can be foamed up to adjustable heights.

In the following example, the silicate solution, hydrogen peroxide and hardener were fed separately into the mixing chamber. The formulations and details of the methods of carrying out the experiments are summarized in Table (I).

The following hardeners were used:

a. Butanediol-bis-chloroformate
b. Hexanediol-bis-chloroformate
c. 2,4-Dichloro-benzoyl chloride
d. O-tosyl chloride
e. Isomeric mixture of dichloro-trichloromethyl-benzoyl chloride
f. Pentachloroethyl isocyanide dichloride
g. Mixtures of equal parts of benzotrichloride and trichloromethyl isocyanide dichloride
h. Mixtures of equal parts of a mixture of various chlorinated or polychlorinated propanes obtained from the production of propylene oxide and dipropylene glycol-bis-chloroformate
i. Mixture of equal parts of glycol-bis-trichloroacetate and dibutylpyrocarbonate
k. Suspension of 30 parts of sodium silicofluoride in 70 parts of benzotrichloride
l. $[CL_2C=N-CO-O-CH_2-CH_2-]_2$ (prepared from butanediol and $CL_2C = N - COCl$)

The following silicate solutions were used:

M. 30.2% potash waterglass solution (8.05% $K_2O$ titrated) into which 0.5% of a 50% aqueous alkylsufonate solution has been stirred
N. 38.5% Soda waterglass solution ($Na_2O$ approximately 8.6% titrated)
O. 48.5% soda waterglass solution (12.1% $Na_2O$ titrated)
P. Solution N containign 0.5% of alkylsulfonate ($C_{14}$, Na)
Q. Solution O containing 0.5% of alkylsulfonate ($C_{14}$, Na)

Table (I)

| Example No. | 2 | 3 | 4 | 5 | 6 | 7 | 8 | 9 | 10 | 11 | 12 | 13 | 14 |
|---|---|---|---|---|---|---|---|---|---|---|---|---|---|
| Silicate solution | M | N | O | P | Q | Q | Q | Q | Q | Q | Q | Q | Q |
| Parts/min | 200 | 200 | 200 | 200 | 200 | 200 | 200 | 200 | 200 | 200 | 200 | 200 | 200 |
| Hardener | B | D | G | I | A | C | E | F | F | F | H | K | L |
| Parts/min | 25 | 20 | 20 | 23 | 10 | 18 | 20 | 10 | 10 | 10 | 16 | 30 | 10 |
| $H_2O_2$ solution percentage content | 10 | 50 | 50 | 30 | 30 | 30 | 30 | 30 | 30 | 30 | 30 | 30 | 30 |
| Parts/min | 20 | 8 | 7 | 10 | 8 | 11 | 10 | 5 | 10 | 15 | 9 | 8 | 9 |
| Starting temperature °C | 18 | 13 | 15 | 19 | 18 | 5 | 10 | 18 | 18 | 18 | 15 | 17 | 19 |
| Density of dry foam g/cm³ | 0.11 | 0.08 | 0.07 | 0.09 | 0.10 | 0.07 | 0.09 | 0.28 | 0.09 | 0.05 | 0.08 | 0.07 | 0.09 |

The reaction mixture leaving the mixing chamber was introduced in each case into a square sectioned paper mold in which it foamed up to form a foam block, which was cut out of the paper mold after it had solidified and was dried at room temperature. The densities, determined after constant weight had been reached at room temperature, are indicated in Table (1). Further weight loss is recorded after heating to temperatures above 100°C.

If the reaction mixture is discharged on to a moving belt, e.g. of Teflon polymer, the material foams up to form a web of foam. It is, of course, necessary to ensure efficient removal of the vapors of hardener by suction. The foam web may be passed through a heating tunnel so that external heat is supplied in addition to its own heat of reaction in order to accelerate complete reaction of the foams and their final hardening. Microwave heating is advantageously used for this purpose.

EXAMPLE 15

A reaction mixture of 200 parts of silicate solution Q, 20 parts of dichlorobenzene sulfochloride and 15 parts of 30 % hydrogen peroxide is prepared at about 18°C by the method employed in Examples 2 to 14. Immediately after leaving the mixing chamber, this reaction mixture is mixed with 10% of its own weight of polystyrene granulate which contains about 6% of pentane as blowing agent. The resulting composition foams up with vigorous evolution of heat, not only the reaction mixture but also the polystyrene granulate undergoing foaming so that a composite foam which may be used as an insulating material is obtained.

EXAMPLE 16.

Two-hundred Parts of waterglass solution P and 20 parts of pentachloroethylisocyanide dichloride are vigorously mixed with stirring by the method employed in Examples 2 to 14. Stirring may be continued for more than 2,000 seconds at room temperature without the silicate solution solidifying.

If the process is now repeated exactly as described above but with the addition of 10 parts of 30% hydrogen peroxide solution, the mixture starts to foam vigorously after about 20 seconds with gelling and evolution of heat. A foam which has a density of about 0.08 g/cm$^3$ after drying at room temperature is obtained.

This experiment demonstrates the enormous acceleration not only of the rate decomposition of $H_2O_2$ but also of the hardening reaction in the process according to the invention.

EXAMPLE 17

Two-hundred Parts of silicate solution Q and 20 parts of dichloroethylisocyanide dichloride are vigorously stirred together as in Examples 2 to 14. This mixture also fails to gel even after 2,000 seconds at room temperature.

If the process is now repeated, but with the addition of 10 parts of 30% hydrogen peroxide solution, the mixture starts to foam within 40 seconds, with evolution of heat, to yield a foam which has a density of about 0.1 g/cm$^3$ after drying at room temperature.

The same results are obtained when this experiment is carried out in an analogous manner with trichloroethyl isocyanide dichloride.

These experiments also demonstrate the acceleration of the hardening reaction by the addition of hydrogen peroxide,

EXAMPLE 18

Four-hundred Parts of silicate solution P according to Examples 2 to 14 and a mixture of 15 parts of 1,2-dichloroethylisocyanide dichloride and 10 parts of trichlorofluoromethane are mixed with stirring at 18°C. This mixture can be stirred for several minutes without gelling but if 5 parts of 30% hydrogen peroxide are added the mixture, which should be poured into a mold after it has been briefly stirred, starts to foam after a few seconds with evolution of heat. It is removed from the mold after 5 hours and dried in air. A foam which has a unit weight of about 0.08 g/cm$^3$ and can be used as an insulating material is obtained.

EXAMPLE 19

Two-hundred Parts of silicate solution P according to Examples 2 to 14 and a mixture of 15 parts of 1,1,2-trichloroethylisocyanide dichloride (which may be prepared by chlorinating 1,2-dichloroethylisocyanide dichloride under UV radiation at 20°C, b.p./12 mm Hg: 85°C) and 5 parts of petroleum ether (b.p. 30° to 60°C) are mixed with stirring. 3 Parts of 30% hydrogen peroxide are then added and the mixture is poured into a mold after brief stirring. It foams up in the mold to yield a foam which has a unit weight of about 0.1 g/cm$^3$ after drying at room temperature. This foam may be used as an insulating material.

EXAMPLE 20

Four-hundred Parts of silicate solution P according to Examples 2 to 14 are vigorously mixed with 10 parts of trichlorofluoromethane, 25 parts of butanediol-bis-chloroformate and 8 parts of 30% hydrogen peroxide. The mixture, which is at room temperature, is poured into a mold where it foams up with evolution of heat. The foam has a unit weight of about 0.07 g/cm$^3$ when dried at room temperature.

Instead of using butanediol-bis-chloroformate, the experiment may be carried out in the same way using 20 parts of a bis-chloroformate which has been prepared from a commercial dipropylene glycol mixture. The dried foam has a unit weight of about 0.08 g/cm$^3$.

EXAMPLE 21

Two-hundred Parts of silicate solution P according to Examples 2 to 14 are mixed by stirring with 20 Parts of sodium silicofluoride and 20 parts of 30% hydrogen peroxide solution. The mixture foams only insignificantly at room temperature but if 5 parts of pentachloroethylisocyanide dichloride are added, the mixture immediately starts to foam with evolution of heat and solidifies to produce a foam which has a unit weight of 0.11 g/cm$^3$ when dry. This foam may be used as an insulating material.

EXAMPLE 22

395 parts (by weight) of a sodium silicate solution (8.6 % by weight $Na_2O$; 6 % $SiO_2$) are diluted with 155 parts of water. Subsequently a solution of 0.05 parts copper acetate in 2.5 parts aqueous ammonia solution (20 %) is added under stirring. Then 0.15 parts $C_{14}$-alkyl sulfonate sodium and 6 parts of a methyl silicon oil and 600 parts of quartz powder are added. To the resulting mixture at first 70 parts of propylene glycol 1,2-bis(chloroacetic ester) within 10 seconds and then 25 parts of a 30 % aqueous $H_2O_2$-solution are added. This mixture is stirred for additional 10 seconds and then poured in a mold wherein the mixture foams and hardens within 3 minutes. After 10 minutes the plate is put in a drying oven where it is dried for about 12 hours at 160°C.

The resulting foam plate has a density of 250 kg/m³ with a compression strength of 6.8 kg/cm². The plate shows hydrophobic properties, i.e. the material does not take up water. The material can be heated to a temperature of 1,000°C; the material retains the foam structure. The density after heating to 1,000°C to 230 kg/m³ and the compression strength is about 11 kg/cm².

It will be appreciated that the instant specification and examples are set forth by way of illustration and not limitation and that various modifications and changes may be made without departing from the spirit and scope of the present invention.

What is claimed is:

1. In the production of foams by mixing an aqueous silicate solution with a blowing agent and a hardener, molding the mixture, and drying the molded silicate foam, the improvement which comprises using hydrogen peroxide as the blowing agent and using a hardener consisting essentially of a member selected from the group consisting of chloroformic acid esters, chloracetic acid esters, isocyanide dichlorides, sulfochlorides, carboxylic acid chlorides and compounds which contain aliphatically bound labile chlorine.

2. The process according to claim 1, in which the hydrogen peroxide is used as aqueous solution of about 3 to 50% concentration by weight.

3. The process according to claim 2, in which the hydrogen peroxide is employed in about 0.05 to 20% by weight of the entire mass undergoing foaming.

4. The process according to claim 2, in which the hydrogen peroxide is employed in about 0.10 to 10% by weight of the entire mass undergoing foaming.

5. The process according to claim 4, in which an organic blowing agent selected from the group consisting of hydrocarbons and halogenated hydrocarbons boiling from about −25° to 50°C is present in addition to the hydrogen peroxide.

* * * * *